United States Patent
Cruz-Hernandez et al.

(10) Patent No.: US 9,454,881 B2
(45) Date of Patent: *Sep. 27, 2016

(54) HAPTIC WARPING SYSTEM (71) Applicant: Immersion Corporation, San Jose, CA (US)

(72) Inventors: Juan Manuel Cruz-Hernandez, Montreal (CA); Jamal Saboune, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/970,625

(22) Filed: Dec. 16, 2015

(65) Prior Publication Data

US 2016/0104356 A1 Apr. 14, 2016

Related U.S. Application Data (63) Continuation of application No. 14/080,860, filed on Nov. 15, 2013, now Pat. No. 9,245,429.

(60) Provisional application No. 61/874,920, filed on Sep. 6, 2013.

(51) Int. Cl.
- *H04B 3/36* (2006.01)
- *G08B 6/00* (2006.01)
- *G06F 3/01* (2006.01)

(52) U.S. Cl.
CPC ............... *G08B 6/00* (2013.01); *G06F 3/016* (2013.01)

(58) Field of Classification Search
CPC ............................. G06F 3/016; G08B 6/00
USPC ............................................. 340/407.1, 407.2
See application file for complete search history.

(56) References Cited

U.S. PATENT DOCUMENTS

| | | | |
|---|---|---|---|
| 6,374,255 B1 | 4/2002 | Peurach et al. | |
| 7,791,588 B2 * | 9/2010 | Tierling | G06F 3/016 345/156 |
| 9,158,379 B2 | 10/2015 | Cruz-Hernandez et al. | |
| 2002/0165720 A1 | 11/2002 | Johnson et al. | |
| 2003/0067440 A1 | 4/2003 | Rank | |
| 2004/0107356 A1 | 6/2004 | Shamoon et al. | |
| 2005/0134561 A1 | 6/2005 | Tierling et al. | |
| 2007/0126927 A1 | 6/2007 | Yun et al. | |

(Continued)

FOREIGN PATENT DOCUMENTS

GB 2 226 718 A 7/1990

OTHER PUBLICATIONS

Anonymous: "Transcoding—Wikipedia, the free encyclopedia", Feb. 27, 2013, http://en.wikipedia.org/w/index.php?title=Transcoding&olid=540873849.

(Continued)

*Primary Examiner* — Eric M Blount
(74) *Attorney, Agent, or Firm* — Miles & Stockbridge P.C.

(57) ABSTRACT

A system is provided that transforms haptic signals. The system receives a first haptic signal including a first haptic effect that can be generated by a first haptic output device. The system transforms the first haptic signal into a second haptic signal including a second haptic effect that can be generated by a second haptic output device. The system then sends the second haptic signal to the second haptic output device to generate the second haptic effect.

20 Claims, 8 Drawing Sheets

(56) References Cited

U.S. PATENT DOCUMENTS

| | | | |
|---|---|---|---|
| 2008/0136608 A1* | 6/2008 | Guthrie | H04M 19/04 340/326 |
| 2009/0096632 A1* | 4/2009 | Ullrich | H04N 9/8205 340/4.21 |
| 2012/0176415 A1 | 7/2012 | Chao | |
| 2012/0206247 A1 | 8/2012 | Bhatia et al. | |
| 2012/0306631 A1 | 12/2012 | Hughes | |
| 2013/0038792 A1 | 2/2013 | Quigley et al. | |
| 2014/0176415 A1 | 6/2014 | Buuck et al. | |
| 2015/0070260 A1 | 3/2015 | Saboune et al. | |
| 2015/0070261 A1 | 3/2015 | Saboune et al. | |

OTHER PUBLICATIONS

Information that are not included with this Information Disclosure Statement can be found in U.S. Appl. No. 14/080,860.

* cited by examiner

HAPTIC WARPING SYSTEM

CROSS-REFERENCE TO RELATED APPLICATIONS

This application is a continuation of application Ser. No. 14/080,860 filed on Nov. 15, 2013 (the disclosure of which is hereby incorporated by reference), which claims priority of U.S. Provisional Patent Application Ser. No. 61/874,920, filed on Sep. 6, 2013 (the disclosure of which is hereby incorporated by reference).

FIELD

One embodiment is directed generally to a device, and more particularly, to a device that produces haptic effects.

BACKGROUND

Haptics is a tactile and force feedback technology that takes advantage of a user's sense of touch by applying haptic feedback effects (i.e., "haptic effects"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect.

A haptic effect developer can author a haptic effect for the device, and the device can be configured to output the haptic effect. Alternately, a device can receive input, such as audio input, video input, or any other type of sensor input, can convert the input into a haptic effect, and can output the haptic effect (or can convert the input into haptic content and can receive the haptic content along with other audio and/or video content, via mixing or streaming). In either scenario, different types of hardware can be capable of generating different types of haptic effects due to different hardware characteristics. For example, different types of actuators (such as eccentric rotating mass motor actuators, linear resonant actuators, and piezoelectric actuators) are capable of generating different types of haptic effects due to different electromechanical characteristics of the different actuators. In general, a haptic effect developer that wishes to author a haptic effect for a specific type of hardware is required to tailor the haptic effect for the specific hardware. If the haptic effect developer wishes to support multiple hardware types, the haptic effect developer generally has to author different haptic effects, in order to provide an optimal haptic experience for each hardware type. This can result in additional design time and effort involved with authoring haptic effects.

SUMMARY

One embodiment is a system that transforms haptic signals. The system receives a first haptic signal including a first haptic effect that can be generated by a first haptic output device. The system transforms the first haptic signal into a second haptic signal including a second haptic effect that can be generated by a second haptic output device. The system then sends the second haptic signal to the second haptic output device to generate the second haptic effect.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

One embodiment is a system that transforms or "warps" an input haptic signal designed for a specific type of haptic output device to another haptic signal that is designed for another specific type of haptic output device. The input haptic signal can be a haptic signal that is created automatically (e.g., from audio input, video input, and/or sensor input), or created manually (e.g., by a haptic effect designer using a haptic effect development platform). The input haptic signal can be created for any type of actuator (e.g., eccentric rotating mass motor actuator, linear resonant actuator, and piezoelectric actuator), or other type of haptic output device. The input haptic signal can be transformed into an output haptic signal so that the output haptic signal can produce the optimal haptic experience when played on a different type of actuator, or other type of haptic output device. In transforming the input haptic signal, characteristics of the target haptic output device can be considered (such as spectral characteristics and temporal characteristics), and the input haptic signal can be transformed into the output haptic signal based on the characteristics of the target haptic output device. For example, a haptic signal that is created for a high-definition actuator can be transformed into a haptic signal that is created for a standard-definition actuator. A standard-definition actuator is an actuator that can provide a baseline range of different vibration effects with a baseline range of vibration intensities. A high-definition actuator is an actuator that can provide an increased range of different vibration effects with an increased range of vibration intensities. Further, the high-definition actuator can increase and decrease its intensity level at a speed that is sufficient to enable compelling rendering of rapidly changing dynamic haptic effects. Thus, compared to a standard-definition actuator, a high-definition actuator has a fast response time, a high dynamic range, and also a wide frequency response. A high-definition actuator can create haptic effects at a number of frequencies (e.g., 100 Hertz ("Hz") to 400 Hz). In comparison, a standard-definition actuator is an actuator that can generate a limited range of magnitudes, or a limited range of frequencies.

Figure 1:
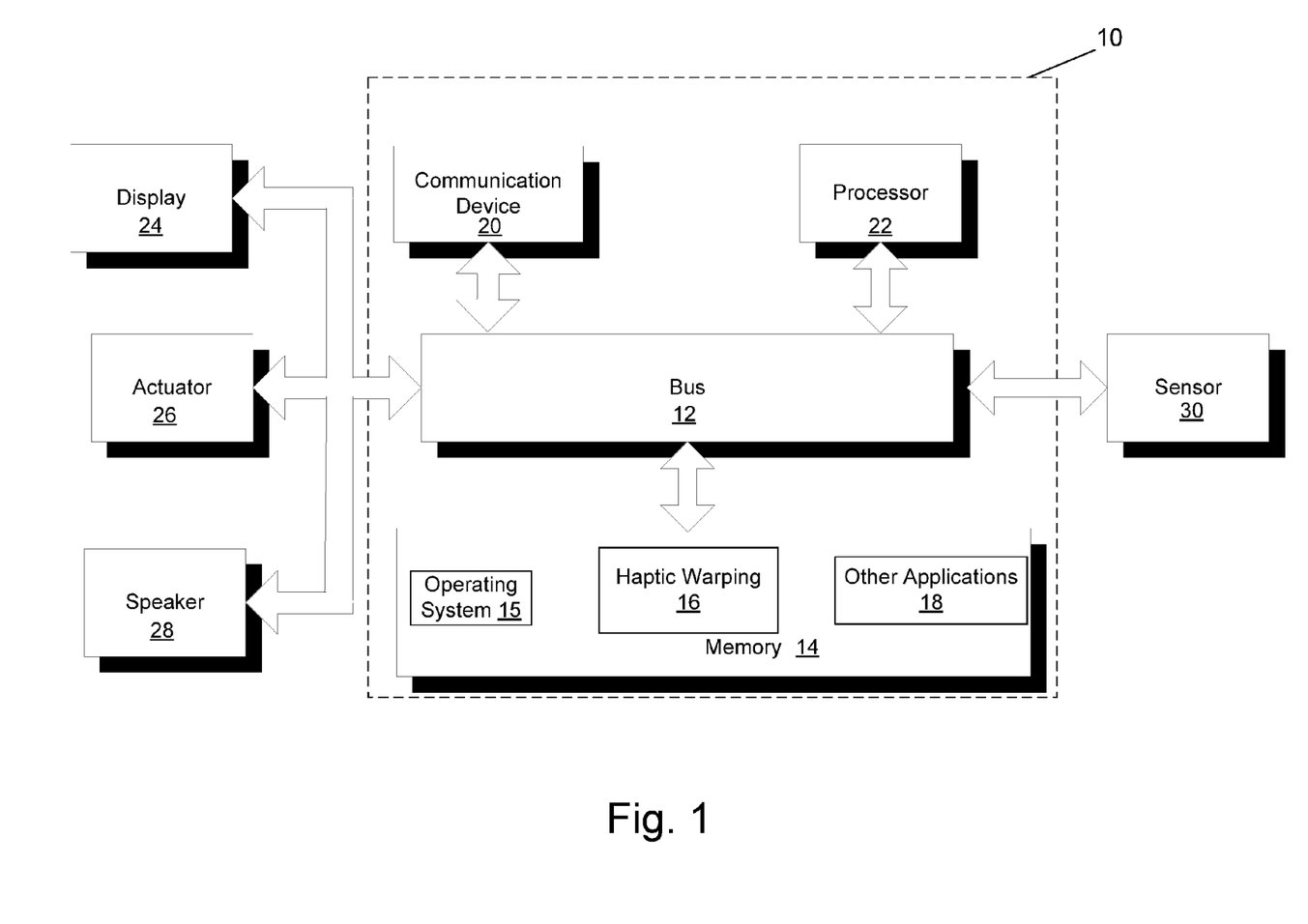
FIG. 1 illustrates a block diagram of a system in accordance with one embodiment of the invention.

FIG. 1 illustrates a block diagram of a system 10 in accordance with one embodiment of the invention. In one embodiment, system 10 is part of a mobile device, and system 10 provides a haptic warping functionality for the mobile device. In another embodiment, system 10 is part of a wearable device, and system 10 provides a haptic warping functionality for the wearable device. Examples of wearable devices include wrist bands, headbands, eyeglasses, rings, leg bands, arrays integrated into clothing, or any other type of device that a user may wear on a body or can be held by a user. Some wearable devices can be "haptically enabled," meaning they include mechanisms to generate haptic effects. In another embodiment, system 10 is separate from the device (e.g., a mobile device or a wearable device), and remotely provides the haptic warping functionality for the device. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium. System 10 can also receive a haptic waveform in a separate track or file, or can receive the haptic waveform that is mixed with other audio and/or video content stored within a file.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a mobile device in one embodiment. The modules further include a haptic warping module 16 that transforms or "warps" a haptic signal, as disclosed in more detail below. In certain embodiments, haptic warping module 16 can comprise a plurality of modules, where each module provides specific individual functionality for transforming or "warping" a haptic signal. System 10 will typically include one or more additional application modules 18 to include additional functionality, such as Integrator™ software by Immersion Corporation.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or user interface to a user. The display 24 may be a touch-sensitive input device, such as a touch screen, configured to send and receive signals from processor 22, and may be a multi-touch touch screen.

System 10, in one embodiment, further includes an actuator 26. Processor 22 may transmit a haptic signal associated with a generated haptic effect to actuator 26, which in turn outputs haptic effects such as vibrotactile haptic effects, electrostatic friction haptic effects, or deformation haptic effects. Actuator 26 includes an actuator drive circuit. Actuator 26 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, system 10 can include one or more additional actuators, in addition to actuator 26 (not illustrated in FIG. 1). Actuator 26 is an example of a haptic output device, where a haptic output device is a device configured to output haptic effects, such as vibrotactile haptic effects, electrostatic friction haptic effects, or deformation haptic effects, in response to a drive signal. In alternate embodiments, actuator 26 can be replaced by some other type of haptic output device. Further, in other alternate embodiments, system 10 may not include actuator 26, and a separate device from system 10 includes an actuator, or other haptic output device, that generates the haptic effects, and system 10 sends generated haptic signals to that device through communication device 20.

System 10, in one embodiment, further includes a speaker 28. Processor 22 may transmit an audio signal to speaker 28, which in turn outputs audio effects. Speaker 28 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker. In alternate embodiments, system 10 can include one or more additional speakers, in addition to speaker 28 (not illustrated in FIG. 1). Further, in other alternate embodiments, system 10 may not include speaker 28, and a separate device from system 10 includes a speaker that outputs the audio effects, and system 10 sends audio signals to that device through communication device 20.

System 10, in one embodiment, further includes a sensor 30. Sensor 30 can be configured to detect a form of energy, or other physical property, such as, but not limited to, sound, movement, acceleration, bio signals, distance, flow, force/pressure/strain/bend, humidity, linear position, orientation/inclination, radio frequency, rotary position, rotary velocity, manipulation of a switch, temperature, vibration, or visible light intensity. Sensor 30 can further be configured to convert the detected energy, or other physical property, into an electrical signal, or any signal that represents virtual sensor information. Sensor 30 can be any device, such as, but not limited to, an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense $CPS^2$ 155, a miniature pressure transducer, a piezo sensor, a strain gage, a hygrometer, a linear position touch sensor, a linear potentiometer (or slider), a linear variable differential transformer, a compass, an inclinometer, a magnetic tag (or radio frequency identification tag), a rotary encoder, a rotary potentiometer, a gyroscope, an on-off switch, a temperature sensor (such as a thermometer, thermocouple, resistance temperature detector, thermistor, or temperature-transducing integrated circuit), microphone, photometer, altimeter, bio monitor, camera, or a light-dependent resistor. In alternate embodiments, system 10 can include one or more additional sensors, in addition to sensor 30 (not illustrated in FIG. 1). In some of these embodiments, sensor 30 and the one or more additional sensors may be part of a sensor array, or some other type of collection of sensors. Further, in other alternate embodiments, system 10 may not include sensor 30, and a separate device from system 10 includes a sensor that detects a form of energy, or other physical property, and converts the detected energy, or other physical property, into an electrical signal, or other type of signal that represents virtual sensor information. The device can then send the converted signal to system 10 through communication device 20. Alternatively, the device can convert the sensor signal of sensor 30 into a haptic effect track or file.

Figure 2:
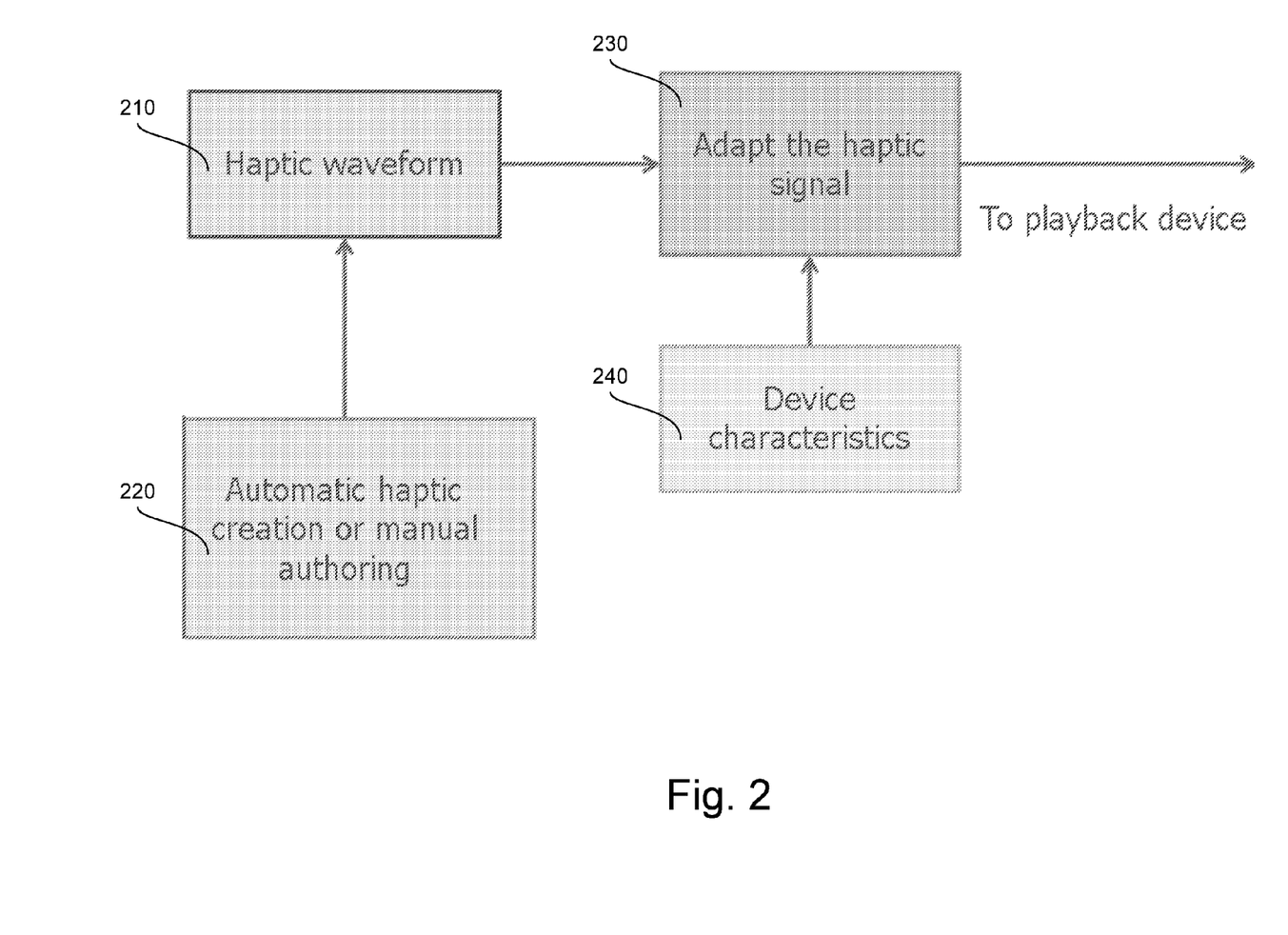
FIG. 2 illustrates a flow diagram of a system that transforms or "warps" a haptic signal, according to an embodiment of the invention.
Figure 6:
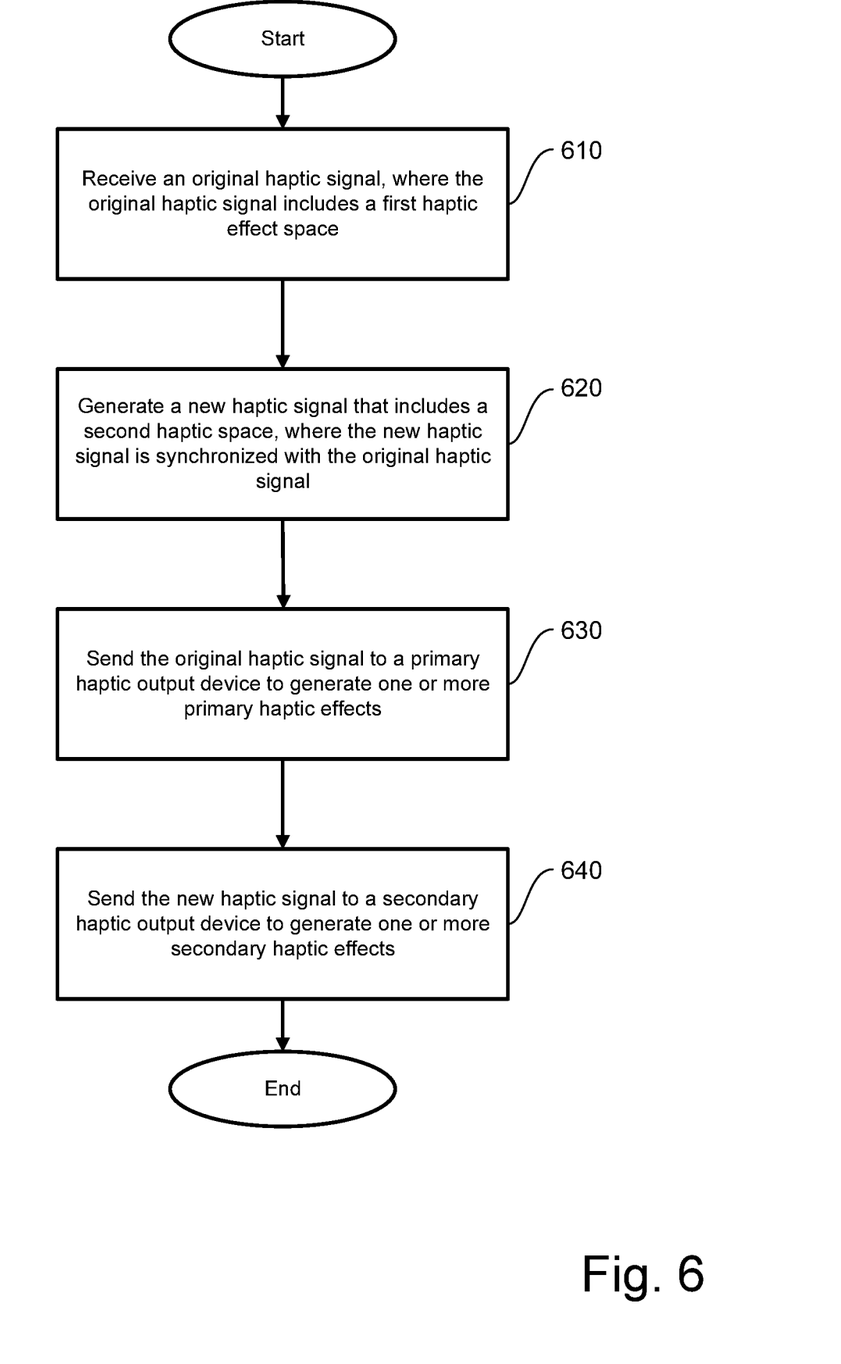
FIG. 6 illustrates a flow diagram of the functionality of a haptic warping module, according to an embodiment of the invention.
Figure 7:
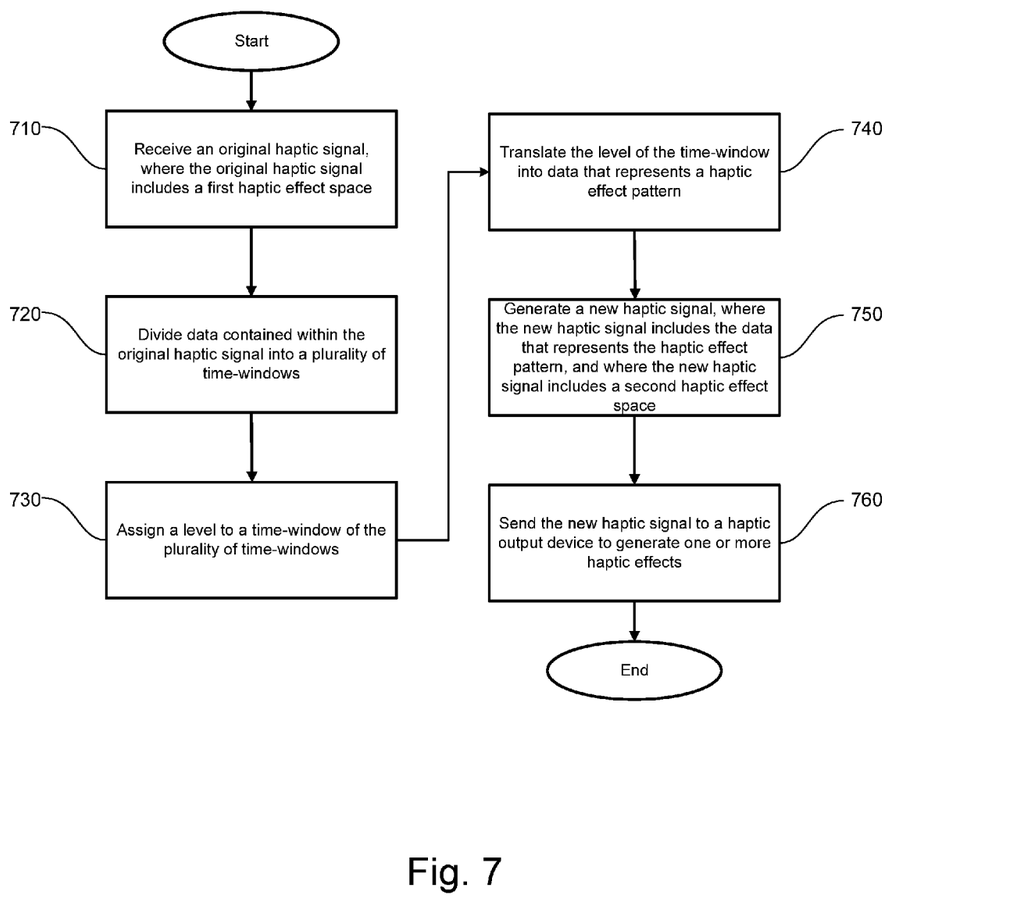
FIG. 7 illustrates a flow diagram of the functionality of a haptic warping module, according to another embodiment of the invention.
Figure 8:
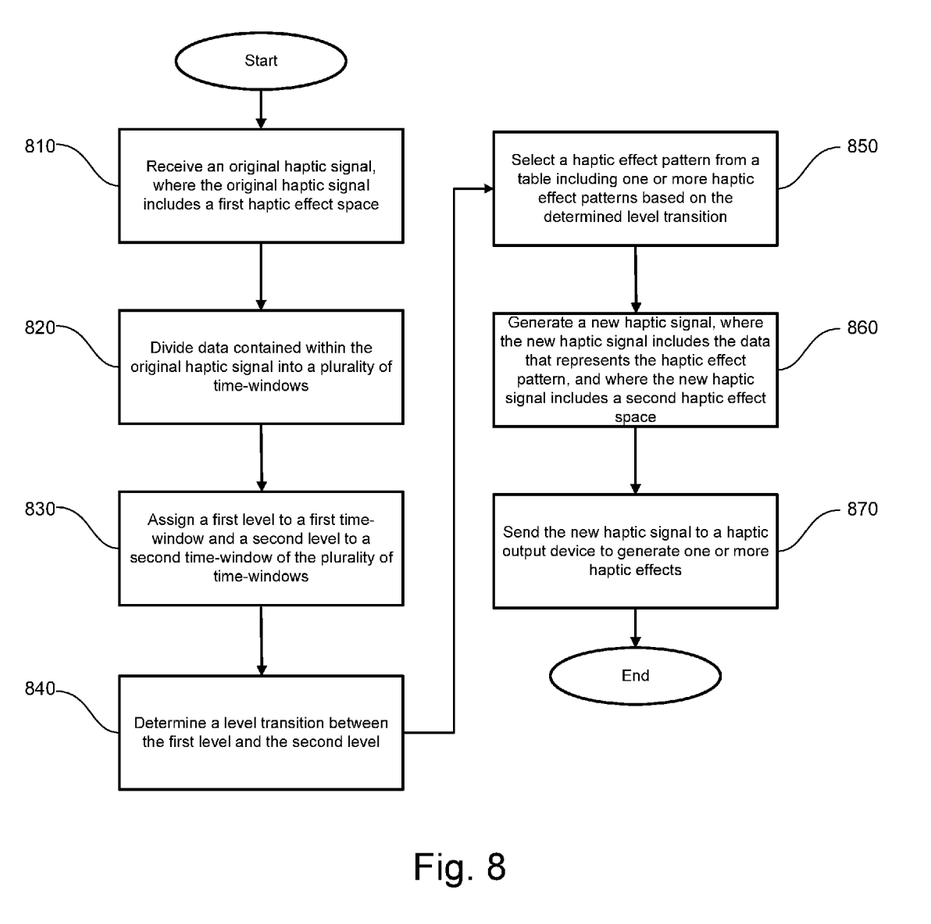
FIG. 8 illustrates a flow diagram of the functionality of a haptic warping module, according to another embodiment of the invention.

FIG. 2 illustrates a flow diagram of a system that transforms or "warps" a haptic signal, according to an embodiment of the invention. In one embodiment, the functionality of FIG. 2, as well as the functionality of FIGS. 6, 7, and 8, are implemented by software stored in memory or other computer-readable or tangible media, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

According to an embodiment, the flow begins at 210. At 210, a haptic signal is received, where a haptic signal can include data, such as a waveform, where a waveform is a set of one or more signal values in a pulse-coded modulation ("PCM") format. A haptic signal can be associated with a haptic effect, and the haptic signal can be sent to a haptic output device, such as an actuator, where the haptic output device can output the haptic effect based on the haptic signal. An example of a haptic effect is a vibrotactile haptic effect that can produce a vibration that is felt by a user of the haptic output device. Other examples of haptic effects can include electrostatic friction haptic effects, or deformation haptic effects.

According to 220, the haptic signal be automatically created from an input signal, or can be manually created using a haptic effect development platform. More specifically, an input signal can be received, and a haptic signal can automatically be generated based on the input signal. Examples of input signals include audio signals, video signals, acceleration signals, orientation signals, ambient light signals, movement signals, temperature signals, or other similar types of signals. In an alternate embodiment, rather than being automatically generated based on an input signal, a haptic signal can be manually generated using a haptic effect development platform, such as Haptic Studio™ by Immersion Corporation. Using the haptic effect development platform, a haptic effect developer can define one or more characteristics of a haptic signal that can be used to produce a desired haptic effect, and the haptic effect development platform can generate the haptic signal based on the one or more defined characteristics. Further, the haptic signal can be designed for a specific type of haptic output device. More specifically, the haptic signal can be associated with a haptic effect space, where the haptic effect space includes a set of haptic effects that can possibly be generated by the haptic output device. Haptic effect spaces are described below in greater detail in conjunction with FIG. 3. The flow then proceeds to 230.

At 230, the haptic signal can be transformed or "warped" (identified in FIG. 2 as "adapted") into a new haptic signal. More specifically, a new haptic signal can be generated, where the new haptic signal includes data, such as a waveform, where the data is based on the data of the original signal. Such a transformation or "warping" is further described below in greater detail in conjunction with FIGS. 4-8. In addition, the new haptic signal can be associated with a new haptic effect space, where the new haptic effect space is different from the original haptic effect space of the original haptic signal. According to 240, the transformation of the haptic signal can be based on one or more characteristics of a target haptic output device. For example, if the new haptic signal is to be sent to a haptic output device that is configured to generate haptic effects that have a high frequency, the haptic signal can be generated with a haptic frequency parameter that has a high value. In these embodiments, the new haptic effect space of the new haptic signal can be a haptic effect space of the target haptic output device. The new haptic signal can then be sent to the target haptic output device (identified in FIG. 2 as "playback device"), where the new haptic signal is played to generate a haptic effect. In certain embodiments, the original haptic signal can also be sent to a different target haptic output device (not illustrated in FIG. 2) to generate a complementary haptic effect that complements the haptic effect generated by the target haptic output device. The flow then ends.

In certain embodiments, the new haptic signal that is generated can be played along with one or more audio signals and/or video signals in order to enhance a user's multimedia viewing experience. In some of these embodiments, a haptic output device can be the same as an audio/video output device (e.g., mobile device). In some other of these embodiments, a haptic output device can be separate from an audio/video output device (e.g., haptic chair, haptic chair, wearable haptic device, etc.).

Further, in certain embodiments, the transformation or "warping" of an input haptic signal into a new haptic signal can be done "offline" by a device that is separate from a device that receives the input haptic signal, such as a server. When the transformation is "offline," data of the entire input haptic signal can be used to transform the input haptic signal into the new haptic signal. The new haptic signal can then be streamed back to the original device, where the original device can send the new haptic signal to a haptic output device. In alternate embodiments, the transformation or "warping" of the input haptic signal into the new haptic signal can be done "online" by the same device that receives the input haptic signal, where the transformation can be performed in real-time or in near-real-time. In these embodiments, different portions of the input haptic signal can be used sequentially to transform the input haptic signal into the new haptic signal, and where the entire input haptic signal is not available at any specific time. Even further, in certain embodiments, the new haptic signal can be stored in a computer file, or multiple computer files, rather than immediately being sent to a haptic output device. In these embodiments, the new haptic signal can be subsequently retrieved from the computer file, or multiple computer files, and the new haptic signal can either be sent to a haptic output device, or can be mixed with one or more audio signals and/or video signals.

Figure 3:
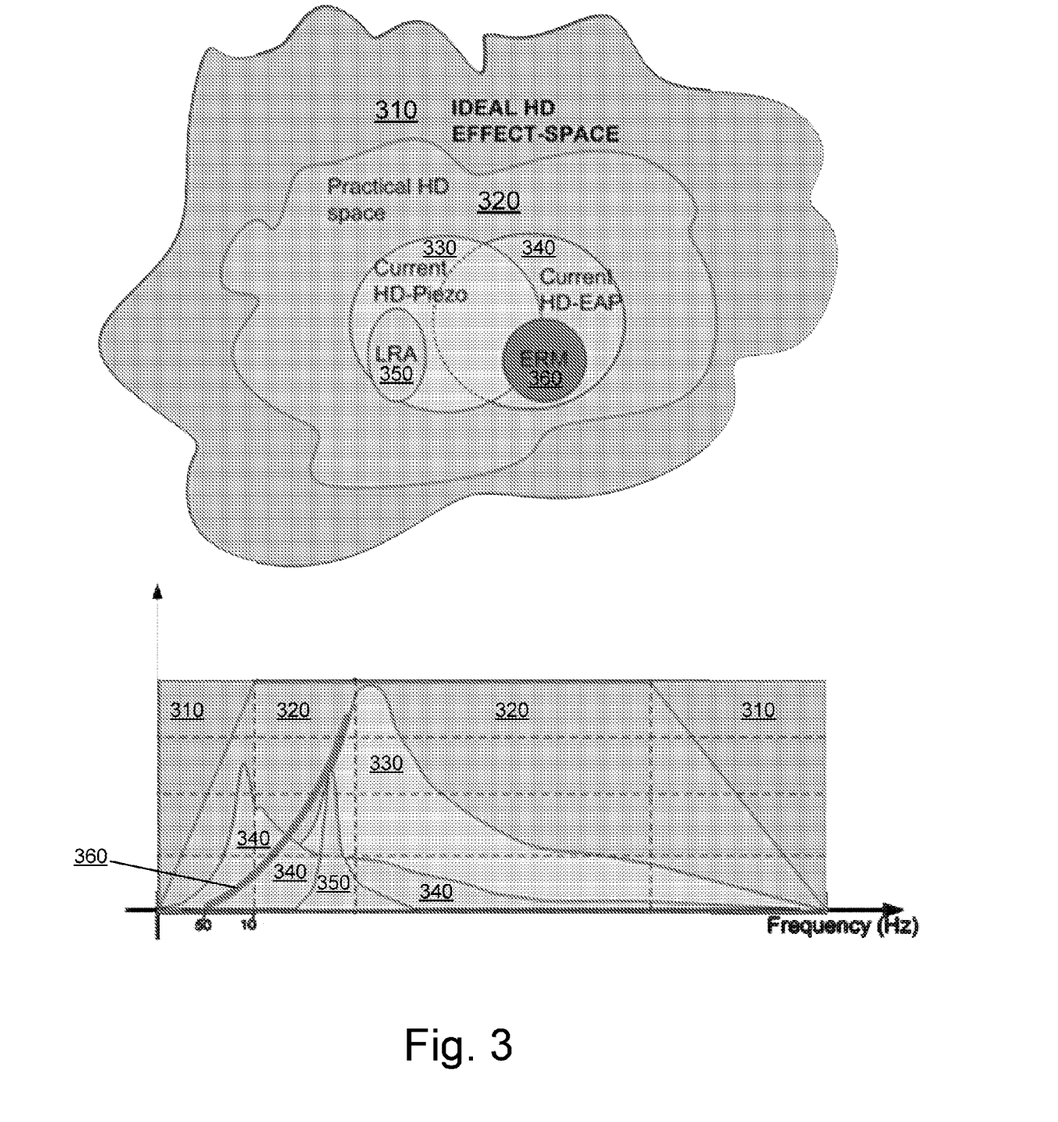
FIG. 3 illustrates an example chart and graph of haptic effect space mappings, according to an embodiment of the invention.

FIG. 3 illustrates an example chart and graph of haptic effect space mappings, according to an embodiment of the invention. As previously described, a haptic signal designed for a specific type of actuator and associated with a specific haptic effect space can be transformed or "warped" into a new haptic signal designed for a different type of actuator and associated with a different haptic effect space. As also previously described, a haptic effect space includes a set of haptic effects that can possibly be generated by a haptic output device, such as an actuator. In the illustrated embodiment of FIG. 3, example vibrotactile haptic effect spaces are illustrated. However, one of ordinary skill in the art would readily appreciate that vibrotactile haptic effect spaces are one example of haptic effect spaces, and that in alternate embodiments, other types of haptic effect spaces, such as electrostatic friction haptic effect spaces, or deformation haptic effect spaces, can be utilized.

According to the illustrated embodiment, ideal high-definition vibrotactile haptic effect space 310 includes all vibrotactile haptic effects that can be produced with real vibrotactile actuators in ideal circumstances (e.g., with no constraints in size or power requirements of a vibrotactile actuator). A subset of ideal high-definition vibrotactile haptic effect space 310 is practical high-definition vibrotactile haptic effect space 320. Practical high-definition vibrotactile haptic effect space 320 includes all vibrotactile haptic effects that can be produced with real vibrotactile actuators in practical circumstances (e.g., with practical constraints in size or power requirements of vibrotactile actuator).

Four subsets of practical high-definition vibrotactile haptic effect space 320 are: current high-definition piezoelectric actuator vibrotactile haptic effect space 330; current high-definition EAP actuator vibrotactile haptic effect space 340; LRA vibrotactile haptic effect space 350; and ERM vibrotactile haptic effect space 360. Current high-definition piezoelectric actuator vibrotactile haptic effect space 330 includes all vibrotactile haptic effects that can be produced with current high-definition piezoelectric actuators based on electromechanical characteristics of such actuators. Current high-definition EAP actuator vibrotactile haptic effect space 340 includes all vibrotactile haptic effects that can be produced with current high-definition EAP actuators based on electromechanical characteristics of such actuators. LRA vibrotactile haptic effect space 350 includes all vibrotactile haptic effects that can be produced with current LRAs based on electromechanical characteristics of such actuators. ERM vibrotactile haptic effect space 360 includes all vibrotactile haptic effects that can be produced with current ERMs based on electromechanical characteristics of such actuators. LRA and ERM haptic effect spaces can sometimes be generated with a high-definition actuator, but some high-definition actuators are not able to entirely recreate some LRA and ERM haptic effect spaces.

In accordance with the illustrated embodiment, a transformation or "warping" algorithm can be applied to an original haptic signal that is associated with one of the vibrotactile haptic effect spaces illustrated in FIG. 3, so that the original haptic signal is transformed into a new haptic signal that is associated with a different vibrotactile haptic effect space illustrated in FIG. 3. For example, an original haptic signal can be associated with ideal high-definition vibrotactile haptic effect space 310. The original haptic signal can be transformed into a new haptic signal associated with ERM vibrotactile haptic effect space 360. As another example, the original haptic signal can be transformed into a new haptic signal associated with LRA vibrotactile haptic effect space 350.

Thus, a goal of the warping algorithm is to allow haptic effects that are designed for a specific haptic output device's type to be played on a different type of haptic output device while preserving the haptic experience provided by the haptic effect. In certain embodiments, transformations from a haptic signal designed for a high-definition piezoelectric actuator to a haptic signal designed for a lower quality actuator (e.g., an LRA or an ERM) can be provided by the warping algorithm. However, in alternate embodiments, the warping algorithm can provide for other types of transformations, including transformations from a lower quality actuator to a higher quality actuator.

In certain embodiments, the warping algorithm can transform a first haptic signal to a second haptic signal by shifting one or more frequencies (or "pitches") of the data contained within the first haptic signal. Such frequency-shifting techniques (or "pitch-shifting" techniques) are further described below in greater detail in conjunction with FIGS. 4 and 5. In alternate embodiments, the warping algorithm can transform the first haptic signal into the second haptic signal by other types of data transformation techniques. Such other types of data transformation techniques are further described below in greater detail in conjunction with FIGS. 6, 7, and 8.

In certain embodiments, haptic signals can be event-based haptic signals, where events are marked within a corresponding audio signal and/or video signal, and a haptic effect can be output based on the encoded audio signal and/or video signal. In alternate embodiments, haptic signals can be parametric haptic signals, where one or more parameterized haptic effects are played at specific points in time. In some of these embodiments, the parameterized haptic effects are encoded within a separate haptic signal, and the parameterized haptic effects are described at specific points in time. In alternate embodiments, haptic signals can be PCM haptic signals, where a PCM audio signal can be converted to a PCM haptic signal. Further, in some embodiments, once a haptic signal has been generated, the haptic signal can be band-pass filtered at different specific windows, and then a magnitude of a specific window can be determined and either transmitted or stored. At the time the haptic signal is decoded, an inverse process can be applied when envelope magnitudes can be used to reconstruct the haptic signal.

Figure 4:
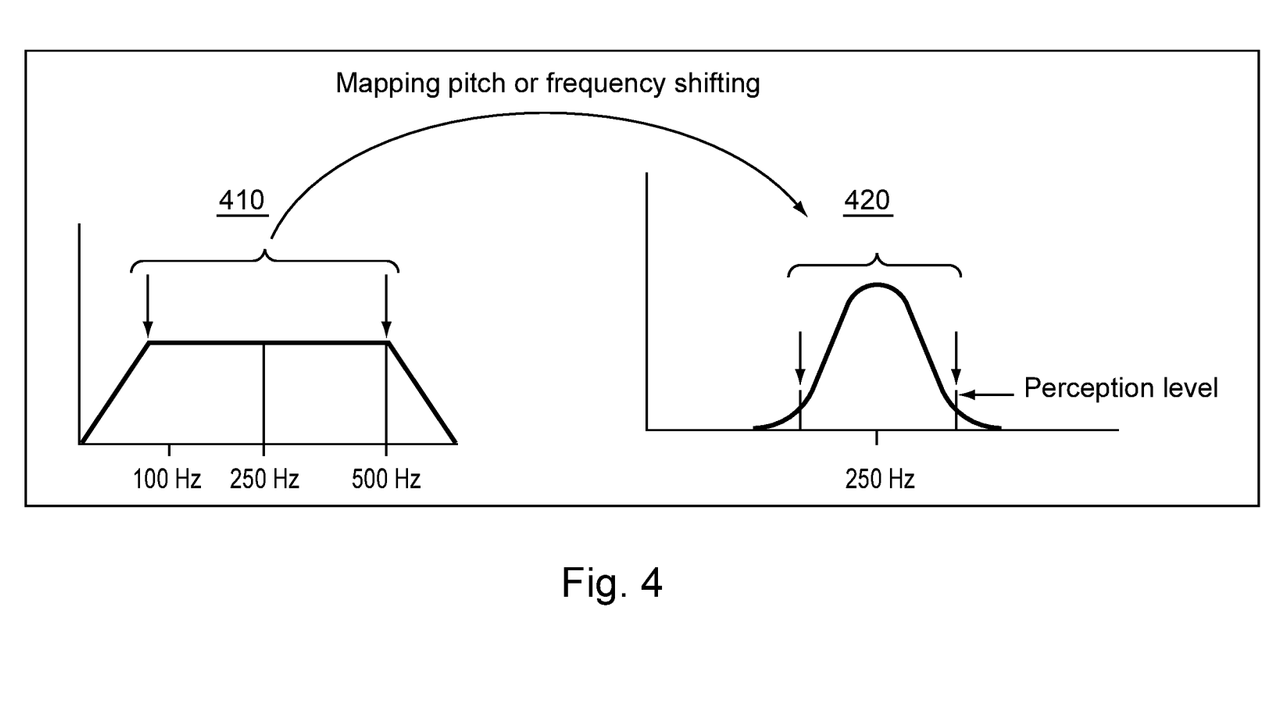
FIG. 4 illustrates an example transformation or "warping" of a first haptic signal associated with a first haptic effect space to a second haptic signal associated with a second haptic effect space, according to an embodiment of the invention.

FIG. 4 illustrates an example transformation or "warping" of a first haptic signal 410 associated with a first haptic effect space to a second haptic signal 420 associated with a second haptic effect space, according to an embodiment of the invention. The first haptic effect space corresponds to a first haptic output device type, and the second haptic effect space corresponds to a second haptic output device type. According to the illustrated embodiment, the transformation involves shifting one or more resonant frequencies (i.e., frequencies $f_{rs1}$) of first haptic signal 410 to one or more resonant frequencies (i.e., frequencies $f_{rs2}$) of second haptic signal 420. Thus, a first frequency bandwidth of first haptic signal 410 can be transformed into a second frequency bandwidth of second haptic signal 420. In certain embodiments, this involves: (a) identifying a resonance of the frequency bandwidth; (b) identifying a frequency that represents a lower perception limit, where a perception limit is a frequency limit where a human can perceive a vibrotactile haptic effect produced by the haptic signal; and (c) identifying a frequency that represents a upper perception limit.

According to the illustrated embodiment, first haptic signal 410 is associated with a practical high-definition haptic effect space, and second haptic signal 420 is associated with a high-definition piezoelectric actuator haptic effect space. However, this is only an example embodiment, and in other embodiments: (a) first haptic signal 410 can be associated with a high-definition piezoelectric actuator haptic effect space, and second haptic signal 420 can be associated with a LRA haptic effect space; (b) first haptic signal 410 can be associated with a high-definition piezoelectric actuator haptic effect space, and second haptic signal 420 can be associated with an ERM haptic effect space; or (c) first haptic signal 410 can be associated with a LRA haptic effect space, and second haptic signal 420 can be associated with an ERM haptic effect space.

In accordance with the illustrated embodiment, the frequencies of haptic signal 410 are shifted to the frequencies of haptic signal 420. In embodiments where haptic signals 410 and 420 are event-based haptic signals, the frequencies of haptic signal 410 can be mapped to the frequencies of haptic signal 420 based on a pre-defined mapping (i.e., each resonant frequency value that triggers a haptic effect can be mapped to another resonant frequency). In embodiments where haptic signals 410 and 420 are parameterized haptic signals, each resonant frequency of haptic signal 410 can be mapped to another resonant frequency of haptic signal 420, where the magnitude, duration, and envelope information of haptic signal 410 remain constant within haptic signal 420. In embodiments where haptic signals 410 and 420 are PCM haptic signals, each magnitude of haptic signal 410 can first be mapped to a magnitude of haptic signal 420, and subsequently, each frequency of haptic signal 410 can be mapped to a frequency of haptic signal 420.

As can be seen in FIG. 4, a resonance of haptic signals 410 and 420 is identified at the frequency of 250 Hz. Further, a perception range of haptic signals 410 and 420 is identified at a frequency bandwidth with a range of 100 Hz to 500 Hz, where a lower perception limit is at a frequency of 100 Hz, and an upper perception limit is at a frequency of 500 Hz. As can also be seen in FIG. 4, the frequencies within the frequency bandwidth of haptic signal 410 are shifted to the frequencies within the frequency bandwidth of haptic signal 420.

Figure 5:
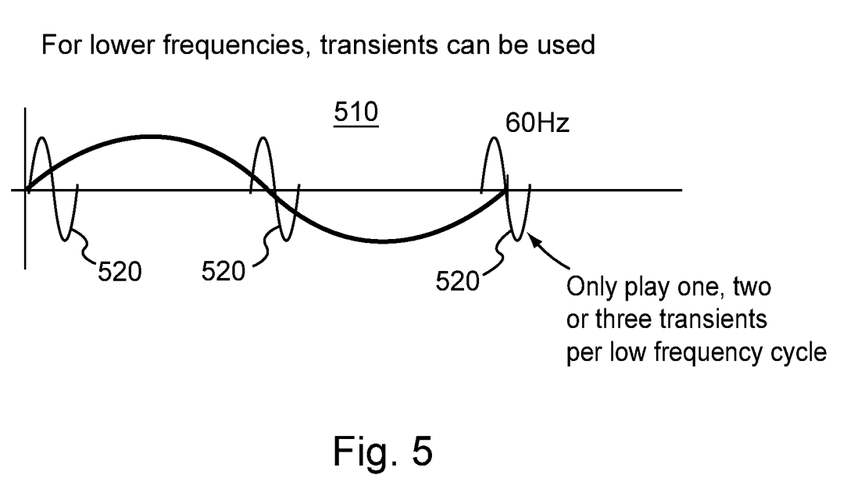
FIG. 5 illustrates an example transformation or "warping" of a haptic signal associated with a first haptic effect space by adding transients to the haptic signal, where the transients are associated with a second haptic effect space, according to an embodiment of the invention.

FIG. 5 illustrates an example transformation or "warping" of a haptic signal 510 associated with a first haptic effect space by adding transients 520 to the haptic signal 510, where transients 520 are associated with a second haptic effect space, according to an embodiment of the invention. According to the embodiment, haptic signal 510 is a haptic signal that solely includes lower frequencies (e.g., frequencies less than or equal to 60 Hz). Transients, such as transients 520, are haptic signals of short duration caused by changes in state. According to the embodiment, when haptic signal 510 solely includes lower frequencies, one or more transients (such as transients 520), can be added to haptic signal 510. Haptic signal 510 and transients 520 can be played at one or more haptic output devices. Thus, the combination of haptic signal 510 and transients 520 constitute a new haptic signal.

FIG. 6 illustrates a flow diagram of the functionality of a haptic warping module (such as haptic warping module 16 of FIG. 1), according to one embodiment of the invention. In certain embodiments, some of the functionality can be omitted. The flow begins and proceeds to 610. At 610, an original haptic signal is received. The original haptic signal can include a first haptic effect space. More specifically, the original haptic signal can generate one or more primary haptic effects when played at a primary haptic output device, where the primary haptic effects can be part of a set of haptic effects that make up the first haptic effect space, and where the set of haptic effects can include all possible haptic effects that can be generated by the primary haptic output device. In certain embodiments, the primary haptic output device can be an actuator. In some of these embodiments, the actuator can be a high-definition actuator, such as a piezoelectric actuator or an EAP actuator. Further, in some of these embodiments, the haptic effects can be vibrotactile haptic effects, and the first haptic effect space can be a vibrotactile haptic effect space. The flow then proceeds to 620.

At 620, a new haptic signal is generated. The new haptic signal can include a second haptic effect space. More specifically, the new haptic signal can generate one or more secondary haptic effects when played at a secondary haptic output device, where the secondary haptic effects can be part of a set of haptic effects that make up the second haptic effect space, and where the set of haptic effects can include all possible haptic effects that can be generated by the secondary haptic output device. Further, the second haptic effect space can be different from the first haptic effect space. This means that the set of haptic effects that make up the first haptic effect space can be different from the set of haptic effects that make up the second haptic effect space.

In certain embodiments, the data contained within the new haptic signal can be based on the data contained within the original haptic signal. In some of these embodiments, the data contained within the new haptic signal can be such that: (a) the new haptic signal causes the secondary haptic output device to generate the one or more secondary haptic effects for a duration of the original haptic signal where the absolute values of the data contained within the original haptic signal are greater than or equal to a pre-defined threshold; and (b) the new haptic signal causes the secondary haptic output device not to generate any secondary haptic effects for a duration of the original haptic signal where the absolute values of the data contained within the original haptic signal are less than the pre-defined threshold. In certain embodiments, the secondary haptic output device can be an actuator. In some of these embodiments, the actuator can be a standard-definition actuator, such as an LRA or an ERM. The flow then proceeds to 630.

At 630, the original haptic signal is sent to the primary haptic output device to generate the one or more primary haptic effects. In certain embodiments, 630 can be omitted, and the original haptic signal is not sent to any haptic output device. The flow then proceeds to 640.

At 640, the new haptic output signal is sent to the secondary haptic output device to generate the one or more secondary haptic effects. The flow then ends.

FIG. 7 illustrates a flow diagram of the functionality of a haptic warping module (such as haptic warping module 16 of FIG. 1), according to another embodiment of the invention. In certain embodiments, some of the functionality can be omitted. The flow begins and proceeds to 710. At 710, an original haptic signal is received. The original haptic signal can include a first haptic effect space. As previously described, the original haptic signal can generate one or more haptic effects when played at a haptic output device, where the haptic effects can be part of a set of haptic effects that make up the first haptic effect space, and where the set of haptic effects can include all possible haptic effects that can be generated by the haptic output device. In certain embodiments, the haptic output device can be an actuator. In some of these embodiments, the actuator can be a high-definition actuator, such as a piezoelectric actuator or an EAP actuator. In alternate embodiments, the actuator can be a standard-definition actuator, such as an LRA or an ERM. Further, in some of these embodiments, the haptic effects can be vibrotactile haptic effects, and the first haptic effect space can be a vibrotactile haptic effect space. The flow then proceeds to 720.

At 720, the data contained within the original haptic signal is divided into a plurality of time-windows. Each time-window includes a portion of the data contained within the original haptic signal. The flow then proceeds to 730.

At 730, a level is assigned to a time-window of the plurality of time windows. A level can be represented by a numerical value. For example, a numerical value of 1, 2, 3, 4, 5, or 6 can be assigned to the time-window. Thus, in other words, the time-window is quantized. Further, in some embodiments, the level can be assigned to the time-window based on a maximum absolute value of the data contained within the time-window. In alternate embodiments, the level can be assigned to the time-window based on a mean absolute value of the data contained within the time-window. In certain embodiments, a level can be assigned to each time-window of the plurality of time-windows. The flow then proceeds to 740.

At 740, the level of the time-window is translated into data that represents a haptic effect pattern. In certain embodiments, the translating includes setting a duration of the haptic effect pattern, where a ratio of the duration of the haptic effect pattern to a duration of the time-window is proportional to a ratio of the level of the time-window to a maximum level. For example, if a duration of the time-window is 30 milliseconds ("ms"), and a level of the time-window is 4 (with a maximum level of 6), then the corresponding duration of the haptic effect pattern is 20 ms. In this example, the haptic effect pattern is subsequently be followed by a duration of 10 ms (i.e., the remaining duration of the time-window) where there is no haptic effect pattern. In certain embodiments, the haptic effect pattern is a vibrotactile haptic effect pattern that represents a vibrotactile haptic effect. Further, in certain embodiments, each level of each time-window can be translated into a separate portion of data that represent a separate haptic effect pattern. The flow then proceeds to 750.

At 750, a new haptic signal is generated that includes the data that represents a haptic effect pattern. The new haptic signal can include a second haptic effect space. More specifically, the new haptic signal can generate one or more haptic effects when played at a haptic output device, where the haptic effects can be part of a set of haptic effects that make up the second haptic effect space, and where the set of haptic effects can include all possible haptic effects that can be generated by the haptic output device. Further, the second haptic effect space can be different from the first haptic effect space. This means that the set of haptic effects that make up the first haptic effect space can be different from the set of haptic effects that make up the second haptic effect space. In certain embodiments, the new haptic signal can include the separate portions of data that represent the separate haptic effect patterns. The flow proceeds to 760.

At 760, the new haptic signal is sent to the haptic output device to generate the one or more haptic effects. The flow then ends.

FIG. 8 illustrates a flow diagram of the functionality of a haptic warping module (such as haptic warping module 16 of FIG. 1), according to another embodiment of the invention. In certain embodiments, some of the functionality can be omitted. The flow begins and proceeds to 810. At 810, an original haptic signal is received. The original haptic signal can include a first haptic effect space. As previously described, the original haptic signal can generate one or more haptic effects when played at a haptic output device, where the haptic effects can be part of a set of haptic effects that make up the first haptic effect space, and where the set of haptic effects can include all possible haptic effects that can be generated by the haptic output device. In certain embodiments, the haptic output device can be an actuator. In some of these embodiments, the actuator can be a high-definition actuator, such as a piezoelectric actuator or an EAP actuator. In alternate embodiments, the actuator can be a standard-definition actuator, such as an LRA or an ERM. Further, in some of these embodiments, the haptic effects can be vibrotactile haptic effects, and the first haptic effect space can be a vibrotactile haptic effect space. The flow then proceeds to 820.

At 820, the data contained within the original haptic signal is divided into a plurality of time-windows. Each time-window includes a portion of the data contained within the original haptic signal. The flow then proceeds to 830.

At 830, a first level is assigned to a first time-window of the plurality of time windows, and a second level is assigned to a second time-window of the plurality of time windows. In certain embodiments, the first and second time-windows are contiguous in time (i.e., successive). As previously described, a level can be represented by a numerical value. For example, a numerical value of 1, 2, 3, 4, 5, or 6 can be assigned to the first time-window, and a separate numerical value of 1, 2, 3, 4, 5, or 6 can be assigned to the second time-window. Thus, in other words, the first time-window and the second time window are each quantized. Further, in some embodiments, the first level and the second level can each be assigned to the first time-window and the second time-window, respectively, based on a maximum absolute value of the data contained within the first time-window and the second time-window, respectively. In alternate embodiments the first level and the second level can each be assigned to the first time-window and the second time-window, respectively, based on a mean absolute value of the data contained within the first time-window and the second time-window, respectively. In certain embodiments, a level can be assigned to each time-window of the plurality of time-windows. The flow then proceeds to 840.

At 840, a level transition between the first level and the second level is determined. A level transition is a transition from the first level to the second level. The level transition can be represented by a plurality of numeric values. For example, if a numerical value of 4 is assigned to a first time-window, and a numerical value of 6 is assigned to a second time-window, a level transition can be represented by (4,6). As another example, if a numerical value of 6 is assigned to a first time-window, and a numerical value of 4 is assigned to a second time-window, a level transition can be presented by (6,4). In certain embodiments, a level transition between each level and its succeeding level can be determined. The flow then proceeds to 850.

At 850, a haptic effect pattern is selected from a table that includes one or more haptic effect patterns based on the determined level transition. The table can be a pre-defined table of haptic effect patterns that correspond to level transitions, where the pre-defined table can be defined in advance specifically for the haptic output device or haptic output device type. Further, the one or more haptic effect patterns can be defined in advance specifically for the haptic output device or haptic output device type. In certain embodiments, when a transition between the first level and the second level is not technically feasible (for example, when the determined level transition is not present within the table, or when the duration of the first time-window is too short to accommodate the selected haptic effect pattern), the following can occur: (a) at least one of the first level or the second level can be modified (e.g., adjusted up or down); (b) a new level transition can be determined based on the modification to at least one of the first level or the second level; and (c) a haptic effect pattern can be selected from the table based on the new level determination. Further, in some embodiments, a separate haptic effect pattern can be selected from the table for each determined level transition. The flow then proceeds to 860.

At 860, a new haptic signal is generated that includes the data that represents the selected haptic effect pattern. The new haptic signal can include a second haptic effect space. More specifically, the new haptic signal can generate one or more haptic effects when played at a haptic output device, where the haptic effects can be part of a set of haptic effects that make up the second haptic effect space, and where the set of haptic effects can include all possible haptic effects that can be generated by the haptic output device. Further, the second haptic effect space can be different from the first haptic effect space. This means that the set of haptic effects that make up the first haptic effect space can be different from the set of haptic effects that make up the second haptic effect space. In certain embodiments, the new haptic signal can include the separate portions of data that represent the separately selected haptic effect patterns. The flow proceeds to 870.

At 870, the new haptic signal is sent to the haptic output device to generate the one or more haptic effects. The flow then ends.

Thus, in one embodiment, a system can transform an input haptic signal for a first type of haptic output device into an output haptic signal for a second type of haptic output device. Thus, the system can adapt any haptic content created automatically or manually to a lower quality haptic output device (or in some cases, a higher quality haptic output device) in a relevant manner. As an example, a haptic effect design can design haptic effects once (mainly for high-definition haptic output devices), and have the haptic effects played adequately on all types of haptic output devices. Also, when playing a high-definition haptic signal directly using a standard-definition haptic output device, the system can appropriately transform the high-definition haptic signal so that the haptic effect is experienced on the standard-definition haptic output device as the haptic effect design intended. This allows the system to play any created haptic content on any commercial haptic output device that is available on the market.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to transform haptic signals by:
   receiving a first haptic signal comprising a first haptic effect that can be generated by a first haptic output device;
   transforming the first haptic signal into a second haptic signal comprising a second haptic effect that can be generated by a second haptic output device; and
   sending the second haptic signal to the second haptic output device to generate the second haptic effect.

2. The computer-readable medium of claim 1, wherein the transforming of the first haptic signal into the second haptic signal comprises:
   shifting one or more frequencies or pitches of data contained within the first haptic signal.

3. The computer-readable medium of claim 1, wherein the transforming of the first haptic signal into the second haptic signal comprises:
   shifting a resonant frequency of the first haptic signal to a resonant frequency of the second haptic signal.

4. The computer-readable medium of claim 1, wherein the transforming of the first haptic signal into the second haptic signal comprises:
   identifying a resonance of the first haptic signal and the second haptic signal;
   identifying a perception range of the first haptic signal and the second haptic signal at a frequency bandwidth defined by a frequency that represents a lower perception limit and a frequency that represents an upper perception limit, wherein a perception limit is a frequency limit where a human can perceive a vibrotactile haptic effect produced by a haptic signal; and
   transforming frequencies within the frequency bandwidth of the first haptic signal into frequencies within the frequency bandwidth of the second haptic signal.

5. The computer-readable medium of claim 1, wherein the first haptic signal and the second haptic signal are event-based haptic signals where events are marked within an audio or video signal and haptic effects are output based on data in a corresponding encoded audio signal or video signal.

6. The computer-readable medium of claim 5, wherein the transforming of the first haptic signal into the second haptic signal comprises:

mapping frequencies of the first haptic signal into frequencies of the second haptic signal based on a mapping where each resonant frequency that triggers a haptic effect is mapped to another resonant frequency.

7. The computer-readable medium of claim 1, wherein the first haptic signal and the second haptic signal are parameterized haptic signals in which one or more parameterized haptic effects are played at specific points in time, wherein the one or more parameterized haptic effects are encoded within a separate haptic signal.

8. The computer-readable medium of claim 7, wherein the transforming of the first haptic signal into the second haptic signal comprises:

mapping each resonant frequency of the first haptic signal to a resonant frequency of the second haptic signal while maintaining magnitude, duration, and envelope information of the first haptic signal in the second haptic signal.

9. The computer-readable medium of claim 1, wherein the first haptic signal and the second haptic signal are pulse coded modulation (PCM) haptic signals where a PCM audio signal is converted into a PCM haptic signal.

10. The computer-readable medium of claim 9, wherein each magnitude of the first haptic signal is first mapped to a magnitude of the second haptic signal, and subsequently, each frequency of the first haptic signal is mapped to a frequency of second haptic signal.

11. The computer-readable medium of claim 1, wherein the first haptic signal solely includes frequencies less than or equal to a threshold frequency.

12. The computer-readable medium of claim 1, wherein the transforming of the first haptic signal into the second haptic signal comprises:

adding one or more transients to the first haptic signal, wherein the one or more transients are haptic signals of short duration caused by changes in state.

13. The computer-readable medium of claim 12, wherein the first haptic signal and the one or more transients are played at one or more haptic output devices.

14. A computer-implemented method for transforming haptic signals, comprising:

receiving a first haptic signal comprising a first haptic effect that can be generated by a first haptic output device;

transforming the first haptic signal into a second haptic signal comprising a second haptic effect that can be generated by a second haptic output device; and sending the second haptic signal to the second haptic output device to generate the second haptic effect.

15. The computer-implemented method of claim 14, wherein the transforming of the first haptic signal into the second haptic signal comprises:

shifting one or more frequencies or pitches of data contained within the first haptic signal.

16. The computer-implemented method of claim 14, wherein the transforming of the first haptic signal into the second haptic signal comprises:

shifting a resonant frequency of the first haptic signal to a resonant frequency of the second haptic signal.

17. The computer-implemented method of claim 14, wherein the first haptic signal solely includes frequencies less than or equal to a threshold frequency.

18. The computer-implemented method of claim 17, wherein the transforming of the first haptic signal into the second haptic signal comprises:

adding one or more transients to the first haptic signal, wherein the one or more transients are haptic signals of short duration caused by changes in state.

19. A system for transforming haptic signals, comprising:

a memory configured to store a haptic warping module; and a processor configured to execute the haptic warping module stored on the memory to:

receive a first haptic signal comprising a first haptic effect that can be generated by a first haptic output device;

transform the first haptic signal into a second haptic signal comprising a second haptic effect that can be generated by a second haptic output device; and send the second haptic signal to the second haptic output device to generate the second haptic effect.

20. The system of claim 19, wherein transforming the first haptic signal into the second haptic signal comprises:

shifting one or more frequencies or pitches of data contained within the first haptic signal.

* * * * *